H. L. BEACH.
MOTOR CONTROL SYSTEM.
APPLICATION FILED NOV. 28, 1913.
1,156,656.
Patented Oct. 12, 1915.
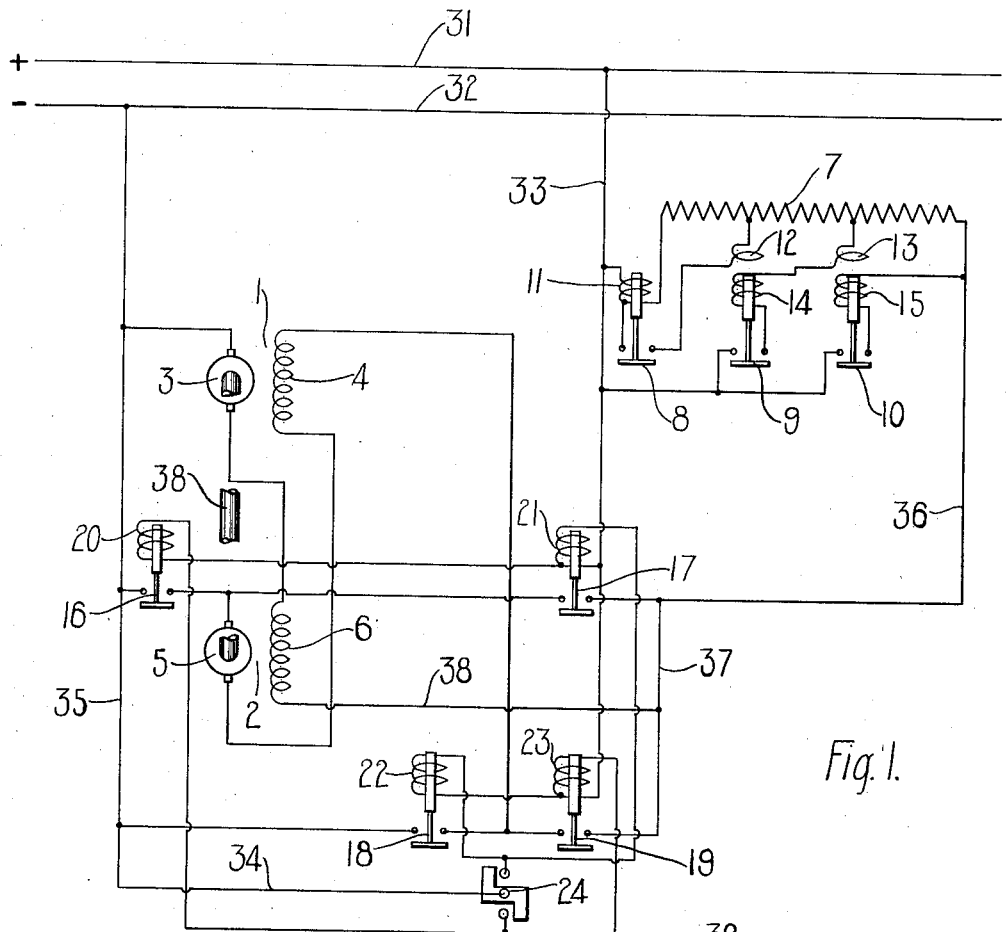
Fig. 1.
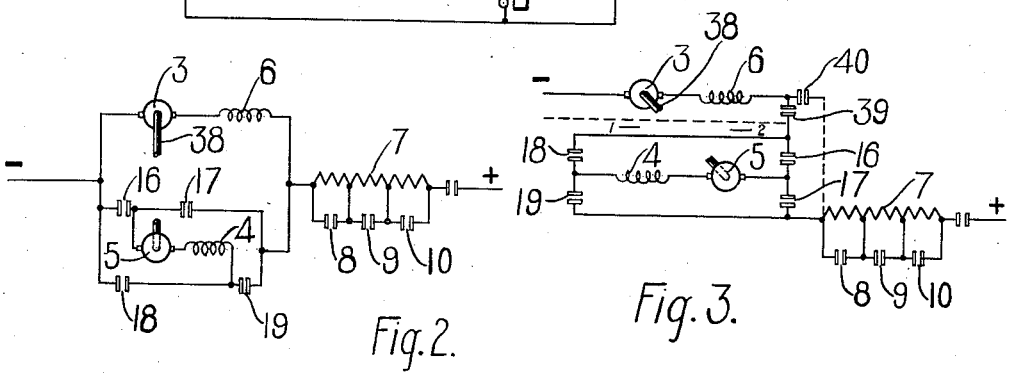
Fig. 2.
Fig. 3.
WITNESSES:
R. J. Fitzgerald
J. R. Langley.
INVENTOR
Howard L. Beach
BY
Wesley G. Carr
ATTORNEY

UNITED STATES PATENT OFFICE.

HOWARD L. BEACH, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

1,156,656.  Specification of Letters Patent.  Patented Oct. 12, 1915.

Application filed November 28, 1913. Serial No. 803,516.

*To all whom it may concern:*

Be it known that I, HOWARD L. BEACH, a citizen of the United States, and a resident of Edgewood Park, in the county of Allegheny and State of Pennsylvania, have invented a new and useful Improvement in Motor-Control Systems, of which the following is a specification.

My invention relates to motor control systems, and it has for one of its objects to provide a simple arrangement for the circuits of two series wound motors, which may be operating either in series or in parallel relation, by means of which the motors may be reversed at will by the employment of a smaller number of switches than have heretofore been necessary.

A further object of my invention is to provide a system in which the use of balancing resistors in connection with the operation of series wound motors in parallel relation is unnecessary.

In the operation of two series wound motors in parallel relation, as heretofore arranged, it has been difficult to satisfactorily operate the same because of the unbalanced loads upon the motors that may be produced by a slight inequality in the resistances of the several circuits. In case the field windings of the motors are traversed by currents of different values, one motor will assume the greater portion of the load and, in case the difference in current values is sufficiently large, one motor drives the other as a generator.

Another disadvantage of the systems, as at present employed, is that a large number of switches or controller contact members are required to reverse the motors when operating either in series or in parallel relation. In some arrangements, as many as eight switches or sets of contact members are necessary to control the direction of rotation of the motors, thus adding materially to the complexity of the system because of the large number of conductors required to control the circuits.

I have provided an arrangement by means of which two motors in series or in parallel relation may be reversed by the use of four switches only, thus greatly simplifying the control apparatus and reducing the cost of the installation. With the circuits arranged according to my invention, it is also possible to avoid the use of balancing resistors in the operation of two motors in parallel relation and, in addition, to insure the automatic equalizing of the loads upon the several motors.

In the accompanying drawings, Figure 1 is a diagrammatic view of circuits and apparatus arranged in accordance with my invention, the motors being connected in parallel relation. Fig. 2 is a view similar to Fig. 1, showing a schematic arrangement of the circuits of Fig. 1. Fig. 3 is a diagrammatic view of a schematic arrangement in which the motors are connected in series relation.

Referring to Fig. 1, two line conductors 31 and 32, which may be connected to any suitable source of direct current, supply energy to two series wound motors 1 and 2 that are connected in parallel relation. The motor 1 comprises an armature 3 and a series field winding 4 that is connected in circuit with the armature 5 of the motor 2, the series field winding 6 of the motor 2 being connected in circuit with the armature 3 of the motor 1. A sectional starting resistor 7, which is in circuit with each of the motors 1 and 2, is controlled by a series of progressively actuated electromagnetic switches 8, 9 and 10 which operate to gradually cut out the resistance of the motor circuits. The switch 8 is provided with a coil 11 and the switches 9 and 10 are respectively provided with coils 12 and 13 each of which is in series with the preceding switch and with coils 14 and 15 each of which is in series with the switch that it controls. The arrangement of the switches 8, 9 and 10 forms no part of my invention and any other suitable method of controlling the resistor 7 may be employed, if desired.

The electrical connections of the circuit comprising the armature 5 and the field winding 4 of the motors 2 and 1, respectively, are controlled by electromagnetic switches 16, 17, 18 and 19 that respectively comprise coils 20, 21, 22 and 23. The switches are operated by a controller 24 which is arranged to complete the circuits of the coils 20 and 23 when it is in one running position and to complete the circuits of the coils 21 and 22 when it is in the other running position. In the "off" or inoperative position of the controller, the coils 20, 21, 22 and 23 are deenergized, and the branch circuit controlled by them is open.

It may be assumed that the controller 24 has been moved to the right and that the line conductors 31 and 32 have been connected to a source of direct current. Current then flows from the conductor 31 through a conductor 33, coil 21, controller 24, and conductors 34 and 35 to the conductor 32. Current also flows from the conductor 33 through the coil 22 and controller 24 to the conductor 34. The coils 21 and 22 are energized to close the switches 17 and 18. Current then flows from the conductor 31 through the conductor 33, coil 11, resistor 7, conductor 36, switch 17, armature 5, field winding 4, switch 18 and conductor 35 to the conductor 32. Current also flows through a parallel circuit from the conductor 36 through conductors 37 and 38, field winding 6, and armature 3 to the conductor 35. The coil 11 is energized to close the switch 8 and thus complete the circuit of the coil 12 and, at the same time, short circuit one section of the resistor 7. The coil 12 is energized to close the switch 9 and thus complete the circuit of the coils 14 and 13 and thereby short circuit a second section of the resistor 7. The switch 10 then closes to short circuit the entire resistor, and the motors are thus gradually accelerated to normal speed.

The motors 1 and 2, the armatures of which may be mechanically connected in any suitable manner, as, for example, by the shaft 38, then assume substantially equal portions of the load to which they may be connected. When either of the motor armatures tends to receive more current than the other, the field winding of the other motor, which is in series with the armature of the one, will be correspondingly energized to increase the torque of the other motor and thus automatically cause it to assume its proper portion of the load.

When it is desired to reverse the direction of the motors, they will first be brought to rest in the usual way by disconnecting the line conductors 31 and 32 from the source of current. The controller will be moved to the left and the conductors 31 and 32 be again connected to the source of current. The coils 20 and 23 will then be energized to close the respective switches 16 and 19 and thereby reverse the connections of the armature 5 and the field winding 4. Current then flows through the armature 5 and the field winding 4 in the direction reverse to that in the operation above described. Current flows in the same direction through the armature 3 and the field winding 6 since their respective connections are unchanged. As is well known, a series motor may be reversed by reversing the connections of either the armature or the series field winding. Consequently, the motors 1 and 2 will each rotate in the direction opposite to that of the above described operation, since the connections of the series field winding 4 of the one and of the armature 5 of the other are reversed. The resistor 7 will be short circuited in the manner described above.

Fig. 2 is a diagrammatic view of a schematic arrangement of the main circuits of the system of Fig. 1. The control circuits are omitted as unnecessary to a clear understanding of the simplified diagram in view of their complete illustration in Fig. 1.

Fig. 3 is a view similar to Fig. 2 in which the motors are connected in series. The parallel circuits comprising the armature of one motor and the field winding of the other motor and the four switches 16, 17, 18 and 19, that are employed in the system of Fig. 1, are also employed in this arrangement, the dotted lines showing the connections for parallel operation. Switches 39 and 40 are provided for changing from series to parallel connection, or vice versa, as desired. When it is desired to connect the motors in series, the switch 39 will be closed and the switch 40 will be opened. The positions of the respective switches 39 and 40 will be reversed for connecting the motors in parallel.

When the motors are operating in series, the switches 16 and 19 are closed and the switches 17 and 18 are open for rotation of the motors in one direction, and the positions of the respective switches are reversed for rotation in the opposite direction. The control circuits for the switches 16, 17, 18 and 19 differ in no material respect from the control circuits for the same that are illustrated in Fig. 1.

I claim as my invention:

1. In a motor control system, the combination with a source of current, and two series-wound motors connected thereto, said motors comprising armatures and field magnet windings, of means comprising a plurality of magnetic switches for simultaneously reversing the direction of flow of current through the armature of one motor and through the field magnet winding of the other motor without altering the electrical connections of the other armature and field magnet winding.

2. In a motor control system, the combination with a source of current, and two series-wound motors electrically connected thereto and to each other, said motors comprising armatures that are mechanically connected and field magnet windings, of means for simultaneously reversing the electrical connections of the armature of one motor and of the field magnet winding of the other motor and maintaining the electrical connections of the other armature and field magnet winding.

3. In a motor control system, the combination with a source of current, of two series-wound motors comprising armatures and field magnet windings, two electrical circuits connected in parallel relation to said source, one of said circuits being permanently connected thereto, each of said circuits comprising the armature of one motor and the field magnet winding of the other motor, and means for controlling the direction of flow of current through one of said circuits.

4. In a motor control system, the combination with a source of current, of two electrical circuits connected in parallel relation to said source, one of said circuits being permanently connected thereto, two series-wound motors, each of which comprises an armature in one of said circuits and a field magnet winding in the other of said circuits, and means for simultaneously reversing the electrical connections of one of said armatures and of one of said field magnet windings.

5. In a motor control system, the combination with a source of current, of a plurality of series-wound motors comprising armatures and field magnet windings, a plurality of parallel circuits connected in parallel relation to said source, one of said circuits being permanently connected thereto, each of said circuits comprising the armature of one motor and the field magnet winding of another motor, and means for controlling the electrical connections of said circuits.

6. In a motor control system, the combination with a source of currents, of two series-wound motors comprising mechanically connected armatures and field magnet windings, two circuits connected in parallel relation to said source, each of said circuits comprising the armature of one motor and the field magnet winding of the other motor, of means comprising a plurality of switches for controlling the connections of one of said circuits and maintaining the connections of the other of said circuits.

7. In a motor control system, the combination with a source of current, of two motors connected to said source, said motors comprising armature windings and field magnet windings, and means for reversing said motors, said means comprising a plurality of parallel circuits including the armature winding of one motor and the field winding of the other motor and a plurality of switches for controlling the connections of one of said circuits without affecting the connections of the other of said circuits.

In testimony whereof, I have hereunto subscribed my name this 18th day of Nov., 1913.

HOWARD L. BEACH.

Witnesses:
B. B. HINES,
M. C. MERZ.